United States Patent
Saito et al.

(10) Patent No.: US 8,551,223 B2
(45) Date of Patent: Oct. 8, 2013

(54) METHOD OF REMOVING UNBURNED CARBON FROM FLY ASH

(75) Inventors: Shinichiro Saito, Kumagaya (JP); Kazuo Abe, Nerima-ku (JP); Kosuke Kimoto, Funabashi (JP); Toshiaki Murata, Fujisawa (JP)

(73) Assignee: Taiheiyo Cement Corporation, Chuo-Ku, Tokyo (JP)

( * ) Notice: Subject to any disclaimer, the term of this patent is extended or adjusted under 35 U.S.C. 154(b) by 1518 days.

(21) Appl. No.: 10/574,762

(22) PCT Filed: Oct. 7, 2004

(86) PCT No.: PCT/JP2004/014819
§ 371 (c)(1),
(2), (4) Date: Oct. 10, 2006

(87) PCT Pub. No.: WO2005/035134
PCT Pub. Date: Apr. 21, 2005

(65) Prior Publication Data
US 2007/0199486 A1   Aug. 30, 2007

(30) Foreign Application Priority Data
Oct. 9, 2003 (JP) ................................ 2003-350449

(51) Int. Cl.
*B01D 19/00* (2006.01)
(52) U.S. Cl.
USPC .................. 95/242; 96/176; 96/177; 209/166
(58) Field of Classification Search
USPC ............... 95/205, 242; 209/166; 96/176, 177
See application file for complete search history.

(56) References Cited

U.S. PATENT DOCUMENTS

| 2,142,207 A | 1/1939 | Price |
| 4,483,624 A * | 11/1984 | Bacon et al. ................. 366/293 |

(Continued)

FOREIGN PATENT DOCUMENTS

| DE | 19810650 | 9/1999 |
| JP | 61-025651 | 4/1986 |

(Continued)

OTHER PUBLICATIONS

Toshiaki Murata, "Coal Preparation Technology for Moderation of Environmental Pollution," Journal "Doryoku (Power)" No. 248 extra issue, 1998.

(Continued)

*Primary Examiner* — Robert A Hopkins
(74) *Attorney, Agent, or Firm* — Stetina Brunda Garred & Brucker

(57) ABSTRACT

Unburned carbon is efficiently removed from fly ash, and effective utilization of the fly ash and removed unburned carbon is attained. Water is added to fly ash to thereby obtain a slurry. A collector is added to the slurry, and shearing force is applied to the slurry and collector to thereby attain a surface modification. The mixture is subjected to flotation operation at which unburned carbon of fly ash is attached to froths and surfaced. The application of shearing force to the slurry and collector can be carried out by means of a submerged agitator whereby an agitation power of 0.7 to 10 kWh/m$^3$ is applied per unit quantity of slurry. The fly ash concentration of the slurry is in the range of 3 to 50 wt. %, and the amount of collector added is in the range of 5 to 100 wt. % based on the amount of unburned carbon of fly ash. The unburned carbon separated by flotation can be used as fuel, and the fly ash (product) having its unburned carbon content reduced to 1 wt. % or below can be used as a cement mixing material or a raw material for production of lightweight aggregate.

16 Claims, 4 Drawing Sheets

(56) References Cited

U.S. PATENT DOCUMENTS

| | | | |
|---|---|---|---|
| 5,066,388 A | 11/1991 | Ross | |
| 6,068,131 A * | 5/2000 | Styron et al. | 209/166 |
| 6,126,014 A * | 10/2000 | Gray et al. | 209/163 |

FOREIGN PATENT DOCUMENTS

| | | |
|---|---|---|
| JP | 61-103992 | 5/1986 |
| JP | 61-106698 | 5/1986 |
| JP | 63143928 | 6/1988 |
| JP | 04-4032 | 8/1992 |
| JP | 583468 | 2/1993 |
| JP | 7136553 | 5/1995 |
| JP | 7222939 | 8/1995 |
| JP | 08-057351 | 5/1996 |
| JP | 8252484 | 10/1996 |
| JP | 09-225441 | 2/1997 |
| JP | 2003-266057 | 9/2003 |
| JP | 2003-284973 | 10/2003 |
| JP | 2004141797 | 5/2004 |
| SU | 1717238 | 3/1992 |

OTHER PUBLICATIONS

Mitsui Engineering & Shipbuilding Co., Ltd., "De-Ashing and De-Sulfurizing Equipment Based on M-COL Technology," Journal, No. 154, 1995.

Mitsui Engineering & Shipbuilding Co., Ltd., "Fine M-COL," Journal, No. 170, 2000.

Mitsui Engineering & Shipbuilding Co., Ltd., "Development of Clean Coal Fuel (M-COL) System," Journal, No. 171, 2000.

\* cited by examiner

METHOD OF REMOVING UNBURNED CARBON FROM FLY ASH

TECHNICAL FIELD

The present invention relates to a method of removing unburned carbon from fly ash, and more particularly to a method of efficiently removing unburned carbon from the fly ash generated in coal firing power plants and so on and efficiently using the fly ash and the removed unburned carbon.

BACKGROUND ART

Fly ash generated in coal firing power plants etc. is used for materials for cement and artificial lightweight aggregates, concrete admixture, etc. However, when fly ash is used as concrete admixture, unburned carbon of fly ash will absorb AE water reducing agent etc., and will reduce the workability of the concrete. And, at the time of placing of the concrete, unburned carbon comes floating and there is harmful influence of a black part occurring in the connecting portion of the concrete. Further, when there was much unburned carbon of fly ash, there was also a problem that the quality of an artificial lightweight aggregate deteriorated. Therefore, only fly ash with little unburned carbon was used for the materials of cement etc., the fly ash with high unburned carbon content could not be used effectively and was processed for reclamation as industrial waste.

In order to solve such a problem, in the first patent document, a technology for removing unburned carbon of coal ash is disclosed. In this technology, after powdery coal ash is agitated and mixed with nonaqueous solvent of a low specific gravity rather than water and water, the mixture is settled and is separated into water layer including coal ash and nonaqueous solvent including unburned carbon.

Further, the second patent document discloses a method of improving recovery rate and efficiently removing unburned carbon of coal ash by adding ionicity collector as a collector after adding acid to water slurry of coal ash in the process of coal ash processing with a hydrophobic process, in which collector is added to the water slurry of coal ash to make the unburned carbon hydrophobic, and flotation separation process, in which frother is added to the water slurry to generate air bubbles and the unburned carbon is adhered to the bubbles for flotation.

Patent document 1: Japanese patent No. 3060665 gazette
Patent document 2: Japanese Patent Publication Heisei 8-252484 gazette

DISCLOSURE OF THE INVENTION

Problems to be Solved by the Invention

However, since it is necessary by the method given in the above-mentioned patent documents 1 to settle powdered coal ash after agitating mixture with the nonaqueous solvent of a low specific gravity rather than water and water, long time was needed for removal of the unburned carbon of coal ash, also after that, from the water layer containing coal ash and the nonaqueous solvent layer containing unburned carbon, each of coal ash and unburned carbon needed to be collected and there was a problem that the unburned carbon of coal ash was efficiently unremovable.

And, the method given in the patent documents 2, in order to efficiently remove the unburned carbon of coal ash using flotation, the acid added to the water slurry of coal ash and the ionicity collector as a collector were needed, so that there was a problem that the cost required to remove the unburned carbon is increased.

The present invention has been made in consideration of the above problems, and the object thereof is to provide a method of efficiently removing unburned carbon from fly ash without special chemicals, and efficiently using fly ash and removed unburned carbon.

Means for Solving the Problem

To achieve the above object, the present invention is characterized in a method of removing unburned carbon from fly ash comprising the step of; adding water to fly ash to produce slurry; adding collector to the slurry; feeding the slurry and the collector to a submerged agitator having a rotation shaft penetrating a cylindrical main body in an axial direction thereof, plurality of chambers formed by dividing an inside of the main body in the axial direction thereof and an agitating vane fixed to the rotation shaft and rotating in each chamber, and adding shearing force to the slurry and collector; adding frother to the slurry and collector to which the sharing force is added; agitating the slurry and collector to generate air bubbles; and adhering unburned carbon of the fly ash to the air bubbles to rise the unburned carbon.

With this invention, by adding shearing force to original fly ash slurry, which contains the unburned carbon and to which collector is added before flotation process, through a submerged agitator having a rotation shaft, which penetrates a cylindrical main body in the axial direction thereof, plurality of chambers divided and formed in the axial direction thereof in the inside of the main body, and an agitating vane, which is fixed to the rotation shaft and rotates in each chamber, each of the unburned carbon in slurry, true fly ash, and the collector can not only raise the distributed effect but transitionally generate activity energy (surface energy) on the surface of each distributed particle. In the process which makes this transitional surface energy calm down, the surface of unburned carbon particles, which becomes more oleophilicitized, and the surface of collector particles stick with each other, and mutual surface energy is lowered. The surface of true fly ash particles, which becomes more hydrophilicitized, adapts itself to water further, it distributes in water and the particles concerned lower the surface energy. As a result, the fly ash particles, to which the collector is adhered on the surface thereof and of which surface is modified, stably raise its oleophilicity and its flotation separation performance is raised in a latter flotation process, so that the fly ash particles distribute in water, and are efficiently separated with the true fly ash which becomes a flotation tailing. As a result, unburned carbon can efficiently be removed from the original fly ash slurry. When shearing force is not applied to the fly ash slurry and the collector and surface modification is not performed to the slurry and the collector, fly ash with 5.0% of unburned carbon can be reduced its unburned carbon content to only approximately 2%. On the other hand, by adding shearing force and performing surface modification, unburned carbon of the fly ash can considerably reduced, and fly ash with approximately 0.5% of unburned carbon can be obtained. In addition, in this case, generally used collector such as kerosene can be used, and a small amount (about 15%) is sufficient for the collector to the quantity of unburned carbon. This makes it possible to reduce the amount of collector used, to allow little kerosene etc. to remain in the fly ash as a product and to make post-processing after the flotation process easy.

In applying shearing force through the submerged agitator to the slurry and the collector, it is preferred to apply 0.7 kWh/m$^3$ or more and 10 kWh/m$^3$ or less of agitation power per amount of unit quantity of slurry. If the agitation power does not reach 0.7 kWh/m$^3$, shearing force applied to the slurry and the collector is inadequate and unburned carbon cannot be removed efficiently, but the agitation power exceeds 10 kWh/m$^3$, the energy consumed to the removal efficiency of unburned carbon becomes excessive and is not preferred.

The fly ash concentration of the slurry is preferably adjusted to be 3 weight percent or more and 50 weight percent or less. If the fly ash concentration is lower than 3 weight percent, it is not preferable since the quantity of slurry increases too much to the fly ash, which should be processed. On the contrary, if the fly ash concentration exceeds 50 weight percent, it is not desirable since it may not form slurry.

It is preferred that the amount of the collector added is 5 weight percent or more and 100 weight percent or less of the amount of unburned carbon. When the amount of the collector added is less than 5 weight percent, the effect of adsorbing unburned carbon of fly ash falls and flotation separation performance cannot be raised, and when the amount of the collector added exceeds 100 weight percent of the amount of unburned carbon of fly ash, the effect as a collector may approach a limit, even if it makes the amount of addition increase, the cost of a collector only increases and it is not desirable.

Water of the fly ash slurry after flotation separation is separated with a solid/liquid separator and can be reused to add to new fly ash slurry, and/or can be reused to erase bubbles when adhering unburned carbon to air bubbles, which lessens drainage out of the system as little as possible.

The unburned carbon of the fly ash that was separated through flotation can be used as fuel. The utilization of the unburned carbon as fuel allows kerosene or the like used as a collector to efficiently be burned simultaneously.

The unburned carbon content in the fly ash, which was separated through flotation, can be made into 1 weight percent or less, and the fly ash can be use as a mixing material for cement. This can suppress absorption of AE water reducing agent by unburned carbon etc. to the minimum and can prevent the fall of the workability of concrete. Moreover, it can also prevent floating up of the unburned carbon at the time of placing concrete, and a black part generated in the connecting portion of the concrete.

The unburned carbon content in the fly ash, which was separated through flotation, can be made into 1 weight percent or less, and the fly ash can be used as a material for lightweight aggregate. This makes it possible to produce precise lightweight artificial aggregate of high strength.

Effect of the Invention

As described above, according to this invention, it is offered a method of removing unburned carbon from fly ash which can mechanically and efficiently remove unburned carbon even if it does not use special chemicals etc., and can use fly ash and the removed unburned carbon effectively.

THE BEST MODE TO CARRY OUT THE INVENTION

FIG. 1 shows an example of the system composition for enforcing a method of removing an unburned carbon from fly ash according to the present invention, and the system roughly comprises a slurry tank 2 for adding water to fly ash to generate slurry, a submerged agitator 4 which applies shearing force to the slurry and a collector after adding the collector to slurry to modify the surface of unburned carbon, a flotation machine 11 which separates the unburned carbon by adding a frother to the slurry, generating air bubbles, making the unburned carbon of fly ash adhere to these air bubbles, and making it rise, a solid/liquid separator 13 which carries out solid/liquid separation of the tailing from the flotation machine 11, a drier 14 for obtaining fly ash (product) which is made to dry the cake from solid/liquid separator 13, a filter press 18 for solid/liquid separating the froth from flotation machine 11 to obtain unburned carbon and so on.

The slurry tank 2 is installed to produce slurry with adding water and fly ash, and is provided with an agitating vane to agitate the slurry therein. At the upper stage of the slurry tank 2, a fly ash tank 1 and water supply equipment are installed, and a pump 3 is arranged to send slurry to the submerged agitator 4 at the down stage of the slurry tank 2.

The submerged agitator 4 is installed to add shearing force to the slurry and the collector and to modify the surface of the unburned carbon. As an example of the submerged agitator 4, there is a high-speed shearing mixer 20 shown in FIG. 2. The high-speed shearing mixer 20 is provided with a cylindrical main body 20a, plurality of partition walls 20c which divide main body 20a into plurality of chambers, and plurality of agitating vanes 20e radially fixed to a rotation shaft 20d, and the rotation shaft 20d and the agitating vanes 20e rotate through a motor 21 and a reduction gear 22. As shown in FIG. 1, a kerosene tank 6, which stores kerosene as a collector, and a pump 5 for supplying the kerosene to the submerged agitator 4, are installed in the upper stage of the submerged agitator 4.

An adjustment tub 7 is installed to add frother supplied through a pump 8 from a frother tank 9 to the slurry and the collector from the submerged agitator 4, and to mix those with each other. The adjustment tub 7 is provided with an agitating vane therein. At the down stage of the adjustment tub 7, a pump 10 is arranged to send the slurry to the flotation machine 11.

The flotation machine 11 is installed to make the unburned carbon of fly ash adhere to air bubbles, to separate into unburned carbon and the fly ash from which unburned carbon was removed. Above the flotation machine 11, an air supplying equipment is installed to generate air bubbles. At the rear stage of the flotation machine 11, a pump 12 is arranged to send tailing to the solid/liquid separator 13.

The solid/liquid separator 13 is installed to solid/liquid separate the tailing containing the fly ash discharged from the flotation machine 11 and to divide the tailing into cake and water.

The drier 14 is installed to dry the cake supplied from the solid/liquid separator 13 with hot wind from a hot blast stove 16, and the dried cake, that is fly ash as product is used as a cement mixing material etc.

A bag filter 15 is installed to collect fine dust from the drier 14, and the collected fine dust is also used as a cement mixing material etc.

The filter press 18 is installed to solid/liquid separate the froth containing the unburned carbon from the flotation machine 11, and the unburned carbon contained in the separated cake can be used as a fuel. Water discharged from the filter press 18 can be reused in the slurry tank 2 etc. through a pump 17.

The hot blast stove 16 is installed to generates hot wind by using the unburned carbon discharged from the filter press 18 as fuel, and the hot wind is used in drier 14.

Next, a method of removing unburned carbon from fly ash with the above-mentioned system according to the present invention will be explained with reference to FIG. 1 as a main drawing.

Fly ash is supplied to the slurry tank 2 from the fly ash tank 1 and is mixed with water to produce slurry. Here, the fly ash concentration in slurry is adjusted in the range from 3 to 50 weight percent.

Next, the slurry containing fly ash in the slurry tank 2 is supplied to the submerged agitator 4 through the pump 3. On the other hand, kerosene as a collector is supplied to the submerged agitator 4 through the pump 5 from the kerosene tank 6. Other than kerosene, generally used collectors such as light oil and heavy oil can be used. The amount of the collector added is adjusted from 5 to 100 weight percent of the amount of unburned carbon of fly ash.

Next, to the slurry and the collector is added shearing force in the submerged agitator 4. The adding process of this shearing force is a characterizing portion of this invention. For example, adding of shearing force can be performed using the high-speed shearing mixer 20 shown in FIG. 2. In the high-speed shearing mixer 20, shearing force is added to the slurry and the collector supplied from the entrance 20f is added through rotating agitating vane 20e in each chamber divided from the partition walls 20c. With the partition walls 20c, the short pass of slurry can be prevented and shearing force can be added to the slurry and collector certainly. The slurry and the collector, to which shearing force is added, are discharged from the exit 20b, and are supplied to the adjustment tub 7.

As described above, adding of shearing force to the fly ash slurry and the collector is for rise of flotation separation performance by modifying the surface of unburned carbon, this point will be explained in detail referring to FIG. 3.

Only by mixing the collector to the slurry containing fly ash, as shown in FIG. 3(a), it is only in the state where coal ash, unburned carbon and the collector are respectively and separately mixed in water. Even if the slurry is supplied to flotation machine in such state, there is little quantity of the unburned carbon that adheres to air bubbles together with the collector. Therefore, the unburned carbon of fly ash is efficiently unremovable with flotation separation.

On the other hand, as shown in FIG. 3(a), when shearing force is added to the slurry and the collector to modify the surfaces thereof, as shown in FIG. 3(b), unburned carbon is adsorbed to the collector. Then, when performing flotation separation with a flotation machine, as shown in FIG. 3(c), the unburned carbon adsorbed to the collector is adhered to air bubbles and rises together with the bubbles. Thus, the flotation separation performance of the unburned carbon can be improved. Meanwhile, when applying shearing force to the slurry and the collector through the high-speed shearing mixer 20, 0.7-10 kWh/m$^3$ more preferably 0.9-1.8 kWh/m$^3$ of agitating force per unit quantity of slurry is added.

Next, as illustrated in FIG. 1, the froth containing the unburned carbon discharged from the flotation machine 11 is solid/liquid separated by the filter press 18 to collect unburned carbon. Water departed from the filter press 18 can be supplied to the slurry tank 2 through the pump 17 to add to new fly ash, or can be reused for erasing bubbles at the time of making unburned carbon adhere to air bubbles in the flotation machine 11.

On the other hand, the tailing containing the fly ash from the flotation machine 11 is solid/liquid separated by the solid/liquid separator 13, when much water is contained in the cake, with the hot wind obtained by burning the unburned carbon discharged from the filter press 18 in the hot blast stove 16, the cake is dried in drier 14, and fly ash as product becoming 1 weight percent or less can be used as cement mixing material etc. Further, the fine dust collected by the bag filter 15 can also be used as cement mixing material etc.

Embodiment 1

1000 ml of water and 200 g of fly ash (containing 5.0 weight percent of unburned carbon) are mixed while being agitated to produce slurry. To the slurry is added kerosene in the range of 0.6-8.0 ml and is agitated at 0-1164 rpm by the high-speed shearing mixer showing in FIG. 2 to add shearing force to the slurry and the kerosene, and unburned carbon of the fly ash is made to be hydrophobic.

After the process of hydrophobic, the slurry is supplied to a flotation machine, and 0.5 mg of MIBC (methyl isobutyl carbinol) as a frother is added to the slurry to make the unburned carbon adhere to air bubbles and rise. These floating air bubbles are taken out as overflow. This process has been performed for 5 minutes.

The relation of the rotational frequency of the high-speed shearing mixer and the unburned carbon of fly ash (product) and fly ash (product) remaining inside of a flotation tub is shown in FIG. 4. Showing this graph, without agitation (the rotational frequency of the high-speed shearing mixer is 0), the unburned carbon of fly ash (product) is 3 weight percent, but with the increase in the rotational frequency of the high-speed shearing mixer, the unburned carbon content of fly ash (product) falls, and the graph shows that the unburned carbon of the fly ash (product) reaches to 0.5 weight percent or less at about 750 rpm in the rotational frequency of the high-speed shearing mixer.

Embodiment 2

1000 ml of water and 200 g of fly ash (containing 5.0 weight percent of unburned carbon) are mixed while being agitated to produce slurry. To the slurry is added kerosene in the range of 0.6-8.0 ml and is agitated at 873 rpm by the high-speed shearing mixer showing in FIG. 2 to add shearing force to the slurry and the kerosene, and unburned carbon of the fly ash is made to be hydrophobic.

After the process of hydrophobic, the slurry is supplied to a flotation machine, and 0.5 mg of MIBC as a frother is added to the slurry to make the unburned carbon adhere to air bubbles and rise. These floating air bubbles are taken out as overflow. This process has been performed for 5 minutes.

The relation of the amount of kerosene added and the unburned carbon of fly ash (product) and fly ash (product) remaining inside of a flotation tub that is shown in FIG. 5. This graph shows that the unburned carbon of fly ash (product) reaches to 0.5% or less in the oil-adding ratio of about 15% to unburned carbon.

EXPLANATION OF SIGNALS

Figure 1:
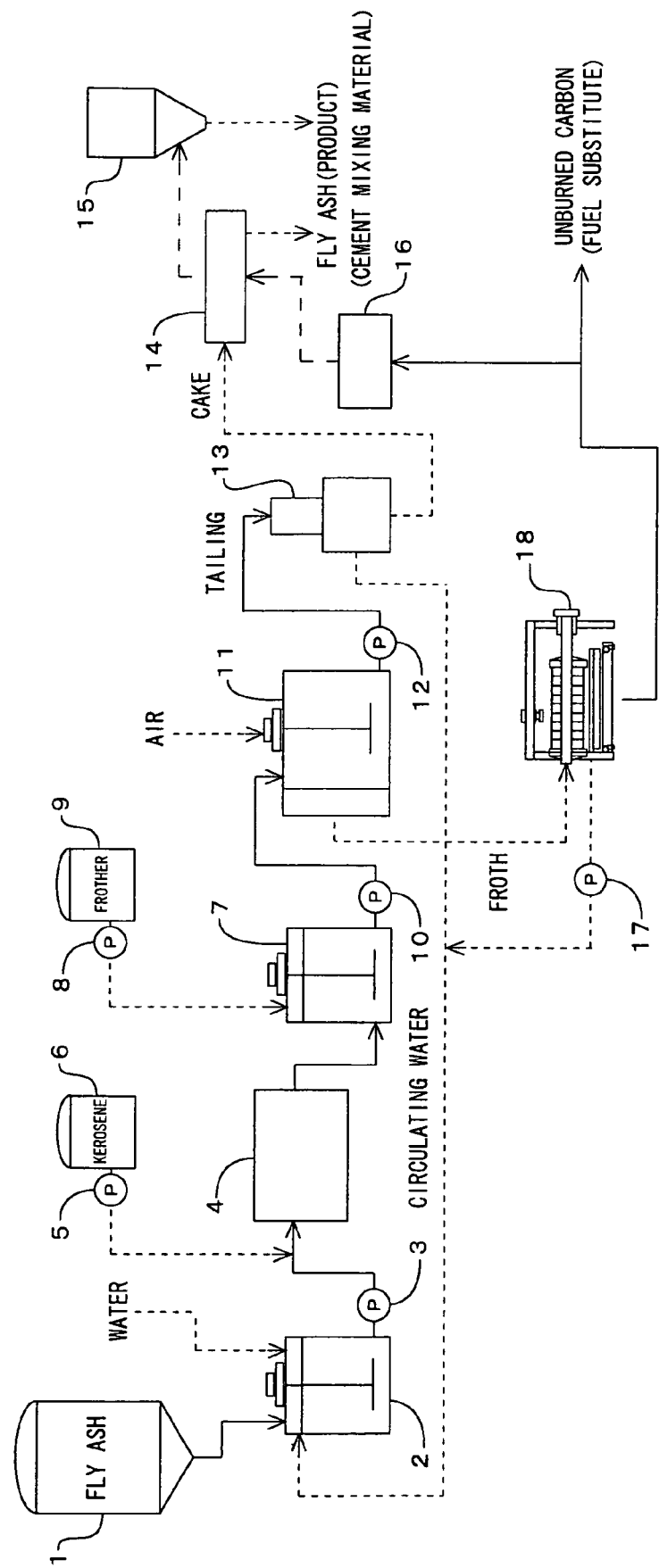
FIG. 1 A flowchart showing an embodiment of the method of removing unburned carbon from fly ash according to the present invention.
Figure 2:
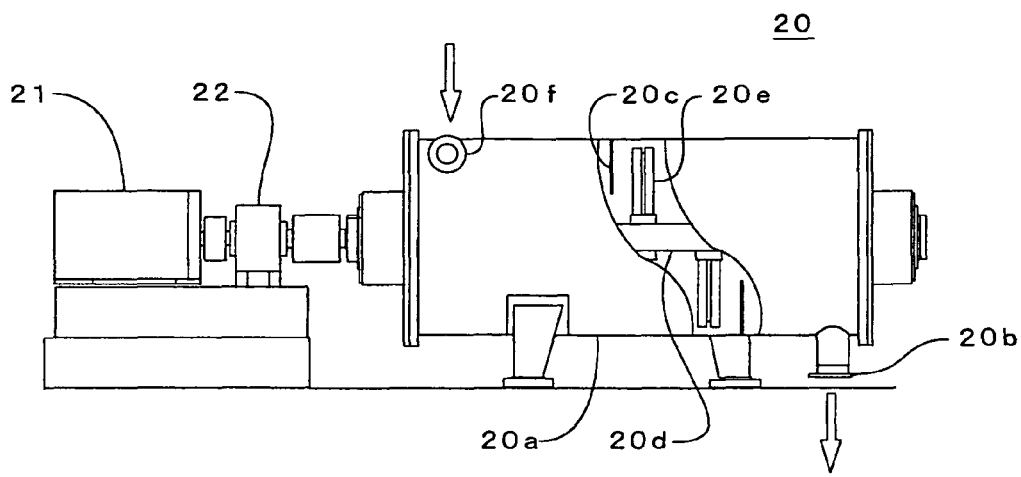
FIG. 2 A fracture schematic diagram in part showing an embodiment for a high-speed shearing mixer as a submerged agitator of the system shown in FIG. 1.
Figure 3:
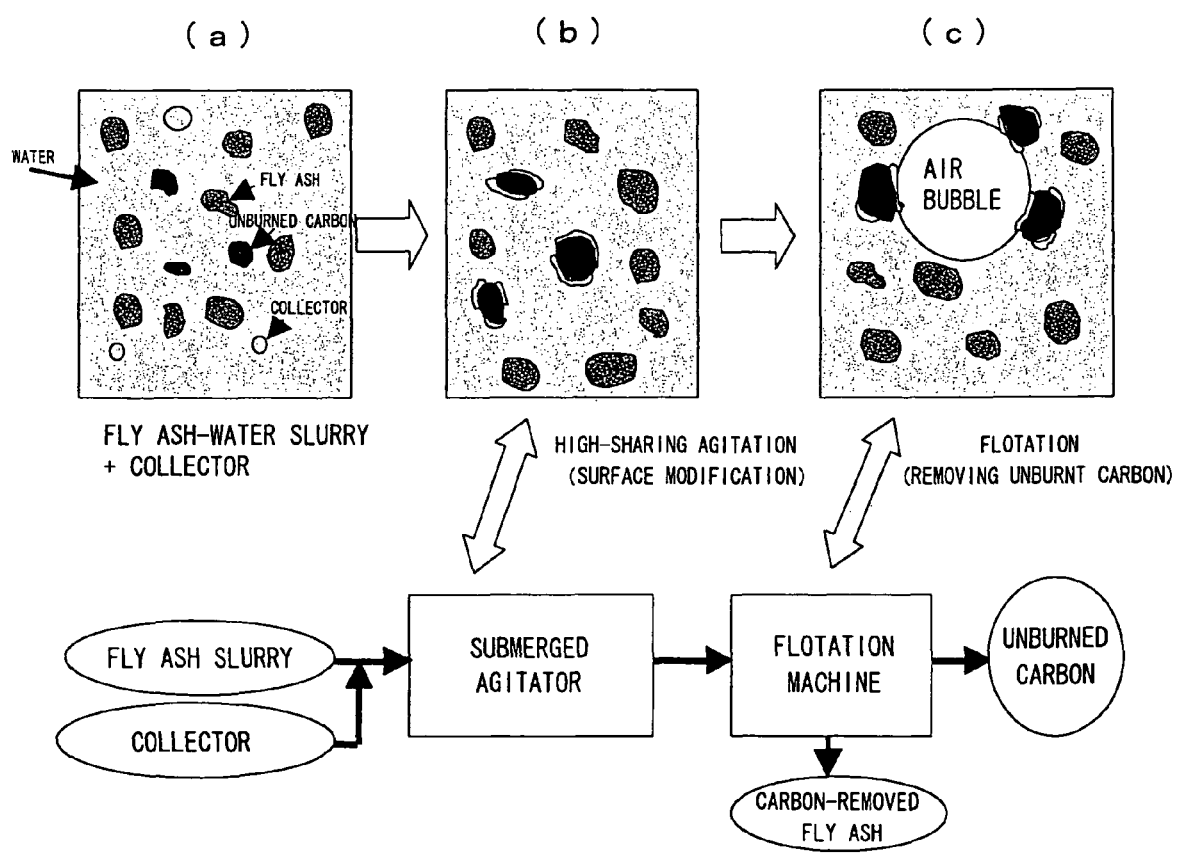
FIG. 3 Drawings for explaining the effect of the surface modification of unburned carbon, in which (a) is a schematic diagram showing the state before the surface modification, (b) the state after the surface modification and (c) the state in a flotation process.
Figure 4:
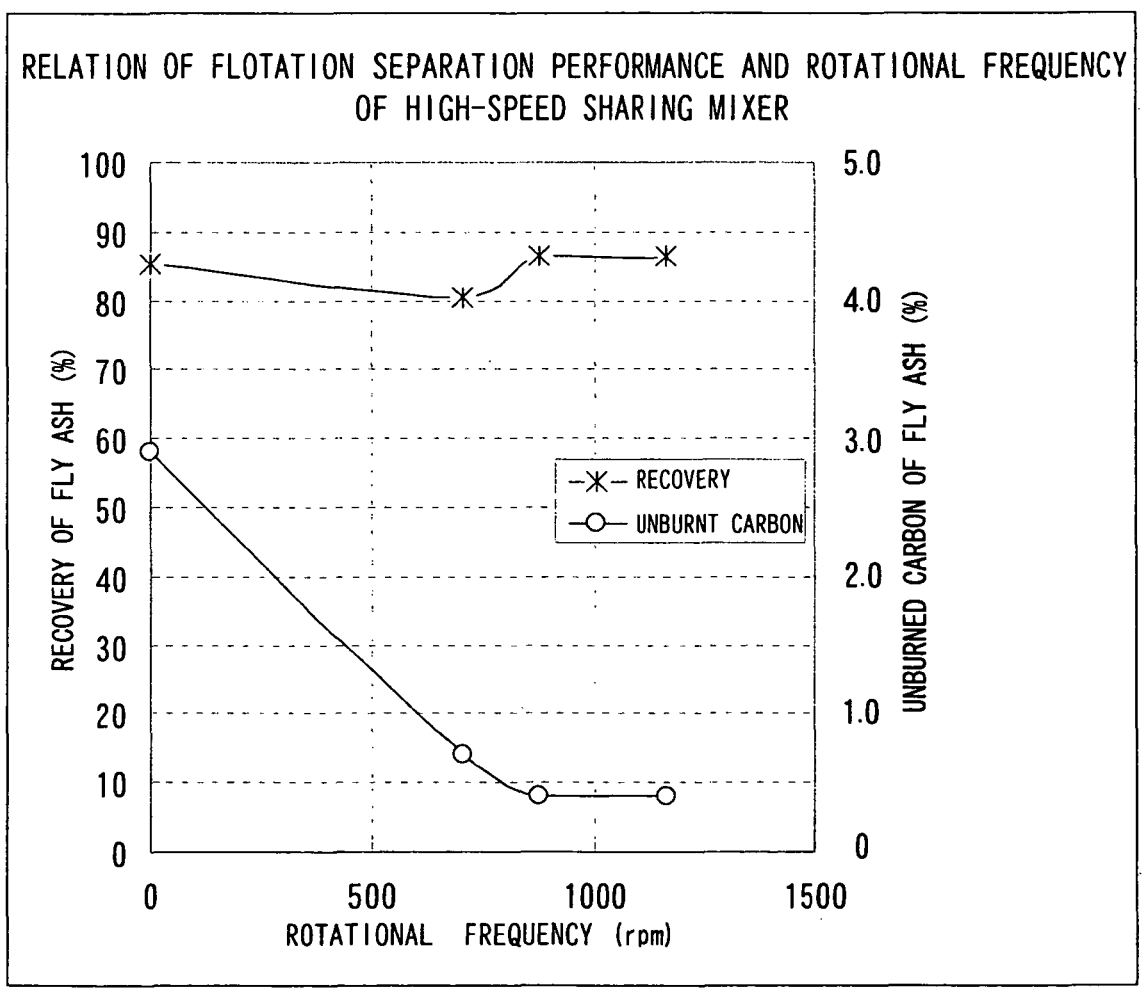
FIG. 4 A graph showing the relation of flotation separation performance and rotational frequency of high-speed sharing mixer in the Embodiment 1 of the present invention.
Figure 5:
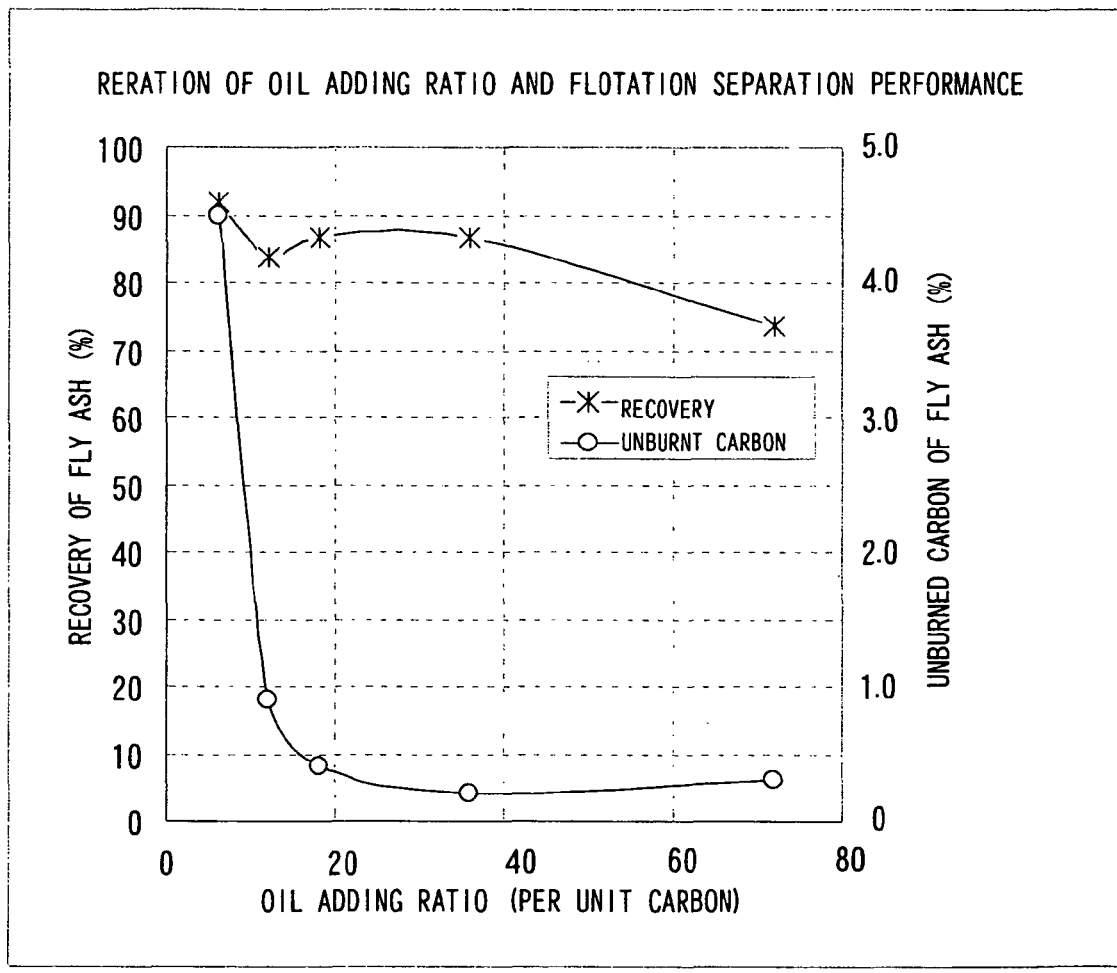
FIG. 5 A graph showing the relation of flotation separation performance and oil adding ration in the Embodiment 2 of the present invention.

1 Fly ash tank
2 Slurry tank
3 Pump
4 Submerged agitator
5 Pump
6 Kerosene tank
7 Adjustment tub
8 Pump
9 Frother tank
10 Pump
11 Flotation machine
12 Pump
13 Solid/liquid separator
14 Drier
15 Bag filter
16 Hot blast stove
17 Pump
18 Filter press
20 High-speed shearing mixer
20a Main body
20b Exit
20c Partition wall
20d Rotation shaft
20e Agitating vane
20f Entrance
21 Motor
22 Reduction gear

The invention claimed is:

1. A method of removing unburned carbon from fly ash comprising the steps of:
adding water to fly ash to produce slurry;
adding collector to said slurry;
feeding said slurry and collector to a submerged agitator having a rotation shaft penetrating a cylindrical main body in an axial direction thereof, a plurality of chambers formed by a plurality of partition walls dividing an inside of the main body in the axial direction thereof and an agitating vane fixed to the rotation shaft, the partition walls and agitating vane overlapping along a longitudinal axis defined by the cylindrical main body, the agitating vane rotating in each chamber to apply a shearing force to said slurry and said collector to modify the surface of said unburned carbon and said collector to enhance adsorption of said unburned carbon to said collector;
adding frother to said slurry and said collector to which the shearing force is added;
agitating said slurry and said collector to generate air bubbles; and
adhering unburned carbon of said fly ash to the air bubbles to rise said unburned carbon.

2. The method of removing unburned carbon from fly ash as claimed in claim 1, wherein said shearing force is 0.7 kWh/m$^3$ or more and 10kWh/m$^3$ or less per unit quantity of slurry.

3. The method of removing unburned carbon from fly ash as claimed in claim 1, wherein the concentration of said fly ash in the slurry is 3 weight percent or more and 50 weight percent or less.

4. The method of removing unburned carbon from fly ash as claimed in claim 1, wherein the amount of said collector added is 5 weight percent or more, and 100 weight percent or less of amount of said unburned carbon of said fly ash.

5. The method of removing unburned carbon from fly ash as claimed in claim 1, further comprising the steps of separating with a solid/liquid separation device water of fly ash slurry that is separated through flotation, and water separated is added to new fly ash or/and the water is used to erase bubbles when adhering unburned carbon to air bubbles, for purpose of reuse.

6. The method of removing unburned carbon from fly ash as claimed in claim 1, wherein said unburned carbon of said fly ash separated through flotation is used as fuel.

7. The method of removing unburned carbon from fly ash as claimed in claim 1, wherein said unburned carbon content in said fly ash separated through flotation is 1 weight percent or less and the fly ash is used as a mixing material for cement.

8. The method of removing unburned carbon from fly ash as claimed in claim 1, wherein said unburned carbon content in fly ash separated through flotation is 1 weight percent or less and the fly ash is used as a material for manufacturing lightweight aggregate.

9. A method of removing unburned carbon from fly ash comprising the steps of:
adding water to fly ash to produce slurry;
adding collector to said slurry;
providing a shearing mixer having;
a cylindrical main body including a plurality of internal partition walls to define a plurality of internal chambers;
a rotation shaft penetrating the cylindrical main body in an axial direction thereof; and
a plurality of agitating vanes fixed to the rotation shaft and rotatable in a respective one of the internal chambers;
the plurality of partition walls and the plurality of agitating vanes overlapping along a longitudinal axis defined by the cylindrical main body;
feeding said slurry and collector to the shearing mixer;
applying a shearing force to said slurry and said collector by rotating the rotation shall so as to modify the surface of said unburned carbon and said collector to enhance the adsorption of said unburned carbon to said collector;
adding frother to said slurry and said collector to which the shearing force is added;
agitating said slurry and said collector to generate air bubbles; and
adhering unburned carbon of said fly ash to the air bubbles to rise said unburned carbon.

10. The method of removing unburned carbon from fly ash as claimed in claim 9, wherein said shearing force is 0.7 kWh/m$^3$ or more and 10kWh/m$^3$ or less per unit quantity of slurry.

11. The method of removing unburned carbon from fly ash as claimed in claim 9, wherein the concentration of said fly ash in the slurry is 3 weight percent or more and 50 weight percent or less.

12. The method of removing unburned carbon from fly ash as claimed in claim 9, wherein the amount of said collector added is 5 weight percent or more, and 100 weight percent or less of amount of said unburned carbon of said fly ash.

13. The method of removing unburned carbon from fly ash as claimed in claim 9, further comprising the steps of separating with a solid/liquid separation device water of fly ash slurry that is separated through flotation, and water separated is added to new fly ash or/and the water is used to erase bubbles when adhering unburned carbon to air bubbles, for purpose of reuse.

14. The method of removing unburned carbon from fly ash as claimed in claim 9, wherein said unburned carbon of said fly ash separated through flotation is used as fuel.

15. The method of removing unburned carbon from fly ash as claimed in claim 9, wherein said unburned carbon content in said fly ash separated through flotation is 1 weight percent or less and the fly ash is used as a mixing material for cement.

16. The method of removing unburned carbon from fly ash as claimed in claim 9, wherein said unburned carbon content in fly ash separated through flotation is 1 weight percent or less and the fly ash is used as a material for manufacturing lightweight aggregate.

* * * * *